(12) United States Patent
Lo et al.

(10) Patent No.: US 12,665,836 B2
(45) Date of Patent: Jun. 23, 2026

(54) AUTOMATIC SUPPRESSION OR UNSUPPRESSION OF ROUTES IN AN ETHERNET VIRTUAL PRIVATE NETWORK (EVPN) DATA CENTER INTERCONNECT (DCI) NETWORK

(71) Applicant: Arista Networks, Inc., Santa Clara, CA (US)

(72) Inventors: Alton Lo, Fremont, CA (US); Alex Nichol, Henley-on-Thames (GB); Saurav Arora, Bangaluru (IN); Karthikeyan Kathiresan, Bangaluru (IN); Akhil Shashidhar, Cedar Park, TX (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/893,758

(22) Filed: Sep. 23, 2024

(65) Prior Publication Data

US 2026/0089088 A1 Mar. 26, 2026

(51) Int. Cl.
H04L 45/00 (2022.01)
H04L 12/46 (2006.01)
H04L 12/66 (2006.01)

(52) U.S. Cl.
CPC .......... *H04L 45/22* (2013.01); *H04L 12/4641* (2013.01); *H04L 12/66* (2013.01)

(58) Field of Classification Search
CPC ..... H04L 45/22; H04L 12/4641; H04L 12/66; H04L 12/46
See application file for complete search history.

(56) References Cited

U.S. PATENT DOCUMENTS

| | | | | |
|---|---|---|---|---|
| 8,141,156 B1 * | 3/2012 | Mao | ...................... | H04L 45/021 |
| | | | | 709/224 |
| 2006/0268681 A1 * | 11/2006 | Raza | ...................... | H04L 45/02 |
| | | | | 370/216 |
| 2016/0134526 A1 * | 5/2016 | Maino | ................. | G06F 9/45558 |
| | | | | 709/226 |
| 2017/0195210 A1 * | 7/2017 | Jacob | ...................... | H04L 45/04 |
| 2019/0288871 A1 * | 9/2019 | Xie | ..................... | H04L 41/0661 |
| 2022/0255835 A1 * | 8/2022 | Mohanty | ............. | H04L 12/4641 |
| 2024/0314060 A1 * | 9/2024 | Ananthamurthy | ...... | H04L 45/66 |

* cited by examiner

*Primary Examiner* — Schquita D Goodwin
*Assistant Examiner* — Linh T. Nguyen
(74) *Attorney, Agent, or Firm* — Sprinkle IP Law Group

(57) ABSTRACT

Systems and methods for the unsuppression of routes or paths associated with MAC/IP addresses suppressed in an Ethernet Virtual Private Network (EVPN) Data Center Interconnect (DCI) Network using Unknown MAC Route (UMR) are disclosed. In particular, embodiments may unsuppress a path or route associated with a MAC/IP address in a data center based upon detection of a move of a host associated with the suppressed path or route associated with the MAC/IP address (e.g., from a remote data center to a local data center). The move may be detected, for example, based on a conflict between a path associated with that MAC/IP address and path received in a route advertisement message for that MAC/IP.

20 Claims, 10 Drawing Sheets

TO FIG. 3D

AUTOMATIC SUPPRESSION OR UNSUPPRESSION OF ROUTES IN AN ETHERNET VIRTUAL PRIVATE NETWORK (EVPN) DATA CENTER INTERCONNECT (DCI) NETWORK

BACKGROUND

Efficiently extending connectivity across multiple sites, particularly in the context of data centers or enterprise networks, is highly desirable in networking scenarios. Ethernet Virtual Private Network (EVPN) has emerged as an advanced and flexible solution for achieving scalable and secure communication across distributed network environments.

Additionally, however, modern enterprises increasingly rely on multiple data centers to ensure business continuity, disaster recovery, and optimal service delivery. Traditional approaches to interconnecting these data centers often encounter challenges in terms of scalability, flexibility, and ease of management. Data Center Interconnect (DCI) over Ethernet Virtual Private Network (EVPN) technology serves as an effective way to facilitate the seamless interconnection of multiple data centers, allowing for efficient resource utilization, load balancing, and high availability across geographically dispersed locations.

There are, however, certain types of issues in these EVPN DCI network topologies that have not been accounted for. These issues may cause the "blackholing" of traffic in such network topologies (e.g., the discarding, disposal of, or fail to forward or route, traffic in such a manner that the traffic does not reach its destination), delay of delivery of such traffic, or the churning (e.g., constant updating) of data tables on devices in such networks. Certain of these issues relate to the synchronization of routes or associated data.

It is thus desired to have a mechanism to improve the efficiency of route synchronization in an EVPN DCI network to avoid route churn and minimize traffic disruption.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which reference numbers indicate features.

DETAILED DESCRIPTION

Figure 1:
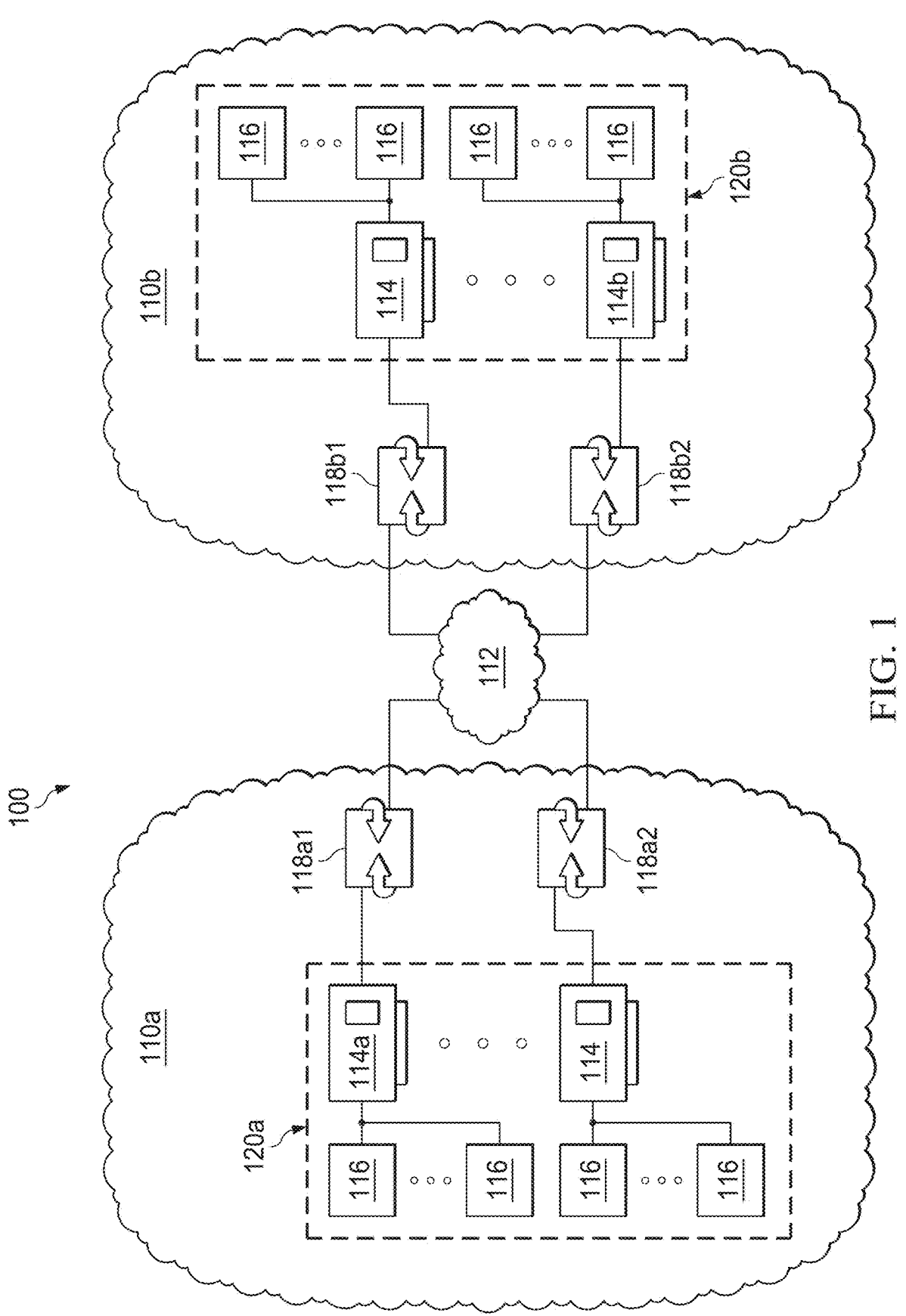
FIG. 1 is a block diagram depicting an architecture of an EVPN DCI network employing UMR including an embodiment of a gateway for unsuppressing (or suppressing) routes or paths associated with MAC/IP addresses.

As discussed, traditional networking solutions often face challenges in efficiently extending connectivity across multiple sites, particularly in the context of data centers or enterprise networks. VLAN (Virtual Local Area Network) based solutions have limitations in terms of scalability and ease of management. Additionally, these solutions may not seamlessly support features such as multi-tenancy and dynamic service provisioning. Ethernet Virtual Private Network (EVPN) is a widely utilized solution for achieving scalable and secure communication across distributed network environments. EVPN is a network overlay solution designed to provide scalable and efficient interconnectivity between geographically dispersed sites or data centers over an existing IP (Internet Protocol) infrastructure. EVPN leverages the capabilities of the Border Gateway Protocol (BGP) to enable the distribution of MAC (Media Access Control) and IP routing information across the network, facilitating the creation of overlay networks with improved scalability, flexibility, and ease of deployment.

Modern enterprises increasingly rely on multiple data centers to ensure business continuity, disaster recovery, and optimal service delivery. A data center is usually a specialized facility that provides data serving and backup as well as other network-based services. Traditional approaches to interconnecting these data centers often encounter challenges in terms of scalability, flexibility, and ease of management. Moreover, ensuring secure and efficient communication between data centers while maintaining low-latency connectivity is crucial for the overall performance of distributed applications and services. Data Center Interconnect (DCI) over EVPN technology thus serves as an effective way to facilitate the seamless interconnection of multiple data centers, allowing for efficient resource utilization, load balancing, and high availability across geographically dispersed locations.

Internet Engineering Task Force (IETF) RFCs 7432, 8365 and 9014 (incorporated herein by reference in their entirety) describe DCI using EVPN. In particular, RFC9014 describes an EVPN DCI solution. In this solution, a data center may partition their overlay network into multiple domains or data centers (used herein substantially equivalently for purposes of this disclosure), with an EVPN gateway serving as the entrance and exit into a respective local data center. The gateway may be coupled to provider edge (PE) devices in its local data center such as switches (e.g., Top-of-Rack (TOR) switches of leaf nodes), hypervisors, or the like. The gateways of the various data centers may connect to one another such that these data centers are interconnected.

Accordingly, when multiple data centers are interconnected using EVPN DCI the data center gateways may (re)advertise Type 2 routes (e.g., EVPN MAC/IP routes) from remote data centers into their local data center. Hence, each data center may have to import all of the MAC addresses from each of the other data centers in an EVPN DCI network. As may be imagined, the number of these MAC addresses is not insignificant. Thus, the sheer number of these MAC addresses may consume a significant amount of (if not overwhelm) the MAC tables of devices (which may be referred to as Network Virtualization Edge (NVE) devices without loss of generality) in a data center.

To address this issue, RFC9014 specifies the use of Unknown MAC Route (UMR) to avoid MAC scale issues on NVE devices. This UMR is advertised into a given data center by the gateways of a data center. An NVE within that data center that understands and processes the UMR will send unknown unicast frames to one of the data center's gateway, which will then forward it on to the correct egress PE. The data center's gateway advertises UMR route to NVEs instead of advertising the specific MAC in order to reduce the device's route pressure. The UMR route may be a regular EVPN MAC/IP advertisement route in which the MAC address length is set to 48, the MAC address is set to 0, and the ESI field is set to the data center gateway's Interconnect Ethernet Segment (I-ES). Each NVE is capable of understanding and processing the UMR route and sending frames to the gateway. The gateway will forward packets to the correct NVE. In addition to advertising the UMR, policies on the gateway may be employed to disable (suppress) (re)advertisements of EVPN MAC/IP routes from the remote data center (e.g., in order to achieve control plane savings on various network devices). In other words, if a route or path associated with a MAC/IP address is suppressed by the network and route advertisement messages are received from another (remote) data center, those received route advertisements may not be (re) advertised by the gateway in the local data center.

The suppression of the advertisements of these EVPN MAC/IP routes may be problematic in certain contexts. In particular, when hosts (e.g., with a MAC address) move between data centers since the EVPN MAC/IP routes from remote data centers are suppressed by the data center gateways the NVE(s) do not receive the advertisements for these routes and are unable to update their MAC tables to reflect the move of the host (e.g., the MAC address associated with the host). This can cause a stale state to persist on the MAC tables in the NVE(s) causing the blackholing (e.g., dropping) of traffic to these MAC addresses. Moreover, the synchronization of the MAC tables across devices in the data center may cause churn of the various MAC tables on the devices, consuming processing resources and further delaying the delivery of traffic. As hosts deployed in these types of data center environments may increasingly be virtual machines (e.g., virtually deployed applications such as those involved with containerized deployment of applications or services), this type of host movement is an increasingly frequent occurrence.

One method to address these MAC mobility issues has been proposed whereby the EVPN gateway in a data center would be responsible for holding separate sequence numbers for the local and remote data centers for each MAC in the EVPN topology. While such a method would address the MAC mobility issue, the solution adds a level of complexity to the implementation of gateways in an EVPN DCI network, including a requirement that an increased amount of state be tracked by such gateways. Specifically, such a solution may be for the EVPN gateway to maintain a sequence number count per data center for each mobile host. Given the number of data centers and hosts involved, such a solution may prove untenable.

Accordingly, it is desirable to have a mechanism to improve the efficiency for EVPN MAC route synchronization in an EVPN DCI network to avoid route churn and minimize traffic disruption in such scenarios. It is additionally desirable to implement such a mechanism without requiring gateways to maintain any additional state with respect to MAC addresses in an EVPN topology.

To address those desires, among others, embodiments as disclosed herein may enable unsuppression of routes or paths (used interchangeably herein for purposes of this disclosure) for MAC/IP addresses suppressed through application of UMR or associated UMR policies in an EVPN DCI environment (referred to also by the shorthand of unsuppressing or suppressing a MAC/IP address). In particular, embodiments may unsuppress a route or path associated with a MAC/IP address in a (e.g., gateway of) a data center based upon detection of a move of a host associated with the suppressed route or path for the MAC/IP address from a remote data center to a local data center (e.g., or the movement of the MAC/IP from a local data center to a remote data center). This detection may be a result of the detection of a conflict between a path (also referred to interchangeably as a route or next hop path for purposes of this disclosure) stored for that MAC/IP at a gateway of a data center and a path as received in a route advertisement message (e.g., an EVPN Route Type 2 MAC/IP advertisement) at the gateway. Namely, if one of the paths (e.g., a stored path) is associated with a remote (or local) data center and the other path (e.g., a path as indicated in a route advertisement message specifying the MAC/IP route) specifies a local (or remote) data center (e.g., one of the stored path or the advertised path is in a local data center and the other of the stored path or the advertised path is in a remote data center) a conflict between the paths may be detected, and the (path for the) MAC/IP address unsuppressed at the gateway.

The unsuppression of the (route associated with the) MAC/IP address (e.g., by the gateway) enables routes for the MAC/IP (e.g., from a remote data center) to be passed through to the NVE(s) such that when the NVEs in the local data center receives the MAC/IP routes from a remote data center they may update their MAC tables, preventing blackholing of traffic. Moreover, by unsuppressing these MAC/IP addresses a uniform sequence number for router advertisement may be maintained across data centers. Additionally, these MAC/IP addresses are eventually (re) suppressed, thereby adhering to any UMR gateway policy specifying suppression of such routes.

Specifically, a gateway of a data center in an EVPN DCI network that employs UMR and suppresses advertisement of EVPN MAC/IP routes for MAC/IP addresses from remote data centers may receive route advertisement messages (e.g., from gateways in remote data centers) where those route advertisement messages may specify MAC/IP addresses and next hop paths, where those next hop paths are remote paths (e.g., route within a remote data center relative to that gateway). These route advertisement messages may be, for example, EVPN Route Type 2 MAC/IP advertisements including a sequence number (e.g., a MAC Mobility Extended Community sequence number) along with the next hop path for that MAC/IP. The gateway can thus update its MAC data (also referred to as a MAC table) based on those received route advertisement messages by including that MAC/IP address along with the (e.g., remote) next hop and the sequence number of the received route advertisement message. Additionally, in accordance with UMR, and any UMR gateway policies at the gateway, the gateway may suppress this (route or path associated with that) MAC/IP address in the local data center If a subsequent route advertisement message is received from a remote data center for that same MAC/IP address the MAC table may be updated with the new next hop route and associated sequence number.

As discussed, hosts (e.g., MAC/IP addresses) may be migrated or otherwise be moved between data centers. A gateway of a local data center (a first data center) will thus receive a route advertisement message (e.g., an EVPN Route Type 2 MAC/IP advertisement) when a host (e.g., with a MAC/IP address) is moved from a remote data center (a second data center) into the local data center of that gateway. Specifically, in such an EVPN DCI network, when the host is connected to (e.g., a port of) a NVE in the (first) local data center (such as a TOR switch or the like), the NVE may determine that a new host has been connected (e.g., and the MAC/IP address of the host is either unknown, or incorrect, in local MAC table of the NVE) and may send a route advertisement message including a sequence number (e.g., a MAC Mobility Extended Community sequence number) along with a next hop path.

Because the MAC/IP address was suppressed (e.g., there was no (re)advertisement of the route for that MAC/IP in the local data center) in the (first) local data center, the NVE to which the moved host is connected may have a UMR suppression address and path installed for (in place of) that MAC/IP address. Thus, the route advertisement message sent by the NVE may have a sequence number of zero (e.g., or another sequence identifier) indicating it is the first time the NVE has seen such a MAC/IP address and the next hop specified may be a local path associated with the local data center and including the NVE.

The gateway may utilize the MAC/IP address specified in the received route advertisement message to access the MAC route table at the gateway and determine that the next hop path specified in the received route advertisement message is a local path (e.g., a route within the (first) local data center of that gateway) while the next hop information associated with that MAC/IP in the MAC table at the gateway is associated with a remote path (e.g., a route associated with a (second) remote data center). The gateway can also determine that this MAC/IP address is suppressed (e.g., is a suppressed remote data center path) at the gateway (e.g., in accordance with a UMR gateway policy) based on suppression data associated with the MAC/IP address at the gateway. Based on the determination of the path conflict (e.g., the next hop path of the received route advertisement message is a local path while the next hop path stored for the MAC/IP at the gateway is a remote path), the gateway may unsuppress that route or path associated with that MAC/IP address (e.g., allow (re)advertisement of EVPN MAC/IP routes from a remote data center for that MAC/IP address). In this manner, embodiments may enable (e.g., automatic) unsuppression of MAC/IP routes from remote data center (e.g., embodiments enable (re)advertisement of MAC/IP routes from remote data centers) based upon the movement of a host (MAC/IP) (e.g., where those MACIP routes would usually otherwise remain suppressed).

The gateway may also evaluate the sequence number of the route advertisement message (e.g., based on the path conflict) received from the NVE in the (first) local data center. Again, because the MAC/IP address was suppressed (e.g., there was no (re)advertisement of the route for that MAC/IP in the (first) local data center), the NVE in the (first) local data center to which the moved host is connected may not have an entry for that MAC/IP in its local MAC table (e.g., may have a UMR suppression address and path installed for (in place of) that MAC/IP address). Thus, the route advertisement message sent by the NVE may have a sequence number of zero (e.g., or another sequence identifier) indicating it is the first time the NVE has seen such a MAC/IP address. Accordingly, when the gateway evaluates the sequence number of the received route advertisement it will compare this sequence number of zero in the route advertisement message received from the NVE in the (first) local data center to which the host is connected with the sequence number of the last route advertisement message received by the gateway stored in association with the MAC/IP address at the gateway.

Based on this comparison, the gateway may determine that the sequence number stored in association with the MAC/IP address at the gateway (e.g., as received in a previous route advertisement message such as that from the (second) remote data center) is greater than the sequence number as included in the route advertisement received from the local NVE (or otherwise indicates a more current or higher priority path for that MAC/IP address than the one received in the route advertisement message from the local NVE). As a result of this determination, the gateway may send a route advertisement message in the (first) local data center where this route advertisement message may include this greater sequence number (e.g., as stored in association with the MAC/IP address at the gateway) and specifying the current path for that MAC/IP address as associated with the greater sequence number at the gateway (e.g., as received from the remote data center).

In certain instances, however, the sequence number stored in association with the MAC/IP address at the gateway (e.g., as received in a previous route advertisement message such as that from the (second) remote data center) may be equal to the sequence number as included in the route advertisement received from the local NVE (e.g., zero). In these types of cases, the determination of a current or higher priority path may be non-deterministic. In certain embodiments, then, if a conflict between paths is detected at the gateway path conflict (e.g., the next hop path of the received route advertisement message is a local path while the next hop path stored for the MAC/IP at the gateway is a remote path) and the (local) path as included in the route advertisement message received from the local NVE is determined to be the current or higher priority path, the gateway may send a route advertisement message in the (first) local data center where this route advertisement message may advertise both the (e.g., remote) path as stored at the gateway in association with the MAC/IP address and the (e.g., local) path as received in the route advertisement message received from the local NVE.

When the NVE(s) in the (first) local data center receive this route advertisement message from the gateway they may update their MAC tables to include this MAC/IP address along with the (e.g., greater) sequence number and the path included in the route advertisement message sent from the gateway. The NVE to which the host (MAC/IP) is now connected in the (first) local data center may thus now have a path associated with that host (MAC/IP) that is a remote data center path associated with that host's (MAC/IP) last location in the (second) remote data center.

Accordingly, when the NVE to which the host (MAC/IP) is now connected in the (first) local data center again receives traffic from that host (MAC/IP) (e.g., at a port of the NVE), the NVE (e.g., an implementation of EVPN on the host), may detect a (e.g., remote to local) move of that host (MAC/IP address), or otherwise detect that the current location of the host (MAC/IP) as connected to that NVE is different than the current path associated with that MAC/IP address in the MAC tables of the NVE. Based on such a detection the NVE may store a new local next hop path associated with the host's location on the NVE in that NVE's MAC table and increment the sequence number associated with the MAC/IP address at the NVE such that the new sequence number is greater than the previous sequence number associated with the MAC/IP address (e.g., as received in the last route advertisement message). The NVE can then issue a route advertisement message with this local next hop path associated with the host's location at that NVE and the incremented sequence number.

The gateway in the (first) local data center may receive this route advertisement message from the NVE. Here, when the gateway evaluates the sequence number it will compare the sequence number in the route advertisement message received from the NVE in the local data center to which the host is connected with the sequence number as stored in association with the MAC/IP address at the gateway (e.g., the sequence number of the last route advertisement message sent by the gateway).

Based on this comparison, the gateway may determine that the sequence number stored in association with the MAC/IP address at the gateway (e.g., as sent in the previous route advertisement message from that gateway) is less than (or less than or equal to) the sequence number as included in the route advertisement received from the local NVE. As a result of this determination, the gateway may determine that the received route advertisement message is most current and store this new local next hop path specified in the route advertisement message (e.g., associated with the host's location on the NVE) in its MAC table and along with the sequence number in the route advertisement message.

The gateway may also (re)advertise this route to gateways in the (second) remote data center by sending a route advertisement message with this new path and sequence number. When the gateway in the (second) remote data center receives this route advertisement message, it will determine the current path and sequence number associated with MAC/IP address (of the route advertisement message) in the MAC table at that gateway (of the (second) remote data center). This gateway (of the (second) remote data center) will then determine that the path as specified in its MAC table is a local path with respect to that gateway (e.g., it's a path local to the (second) remote data center) while the path specified in the route advertisement message for that MAC/IP is a remote path (with respect to that gateway) or that the sequence number of the received route advertisement message is greater than the sequence number as stored in association with the Mac/IP address at that gateway in the remote data center. Thus, the remote gateway may update its MAC tables with the new route as included in the route advertisement message along with the new sequence number. Moreover, the remote gateway will also re(advertise) this new route into its data center (the (second) remote data center) using a route advertisement message with the most current sequence number.

At some point, this remote gateway, in accordance with the implementation of UMR and any UMR gateway policy specifying suppression of such routes, the gateway in the (second) remote data center may issue a withdrawal of this MAC/IP and most current sequence number in the (second) remote data center.

It will be noted that, while eventually avoiding blackholing (e.g., dropping) of traffic to these MAC addresses, the synchronization of the MAC tables across devices in the data center may cause churn of the various MAC tables on the devices, consuming processing resources and blackholing or further delaying the delivery of traffic in the interim. For example, when a host is moved into the (first) local data center, the gateway in the local data may send at least one route advertisement message with an incorrect path before traffic is again received from the moved host at the NVE to which the host is connected and the NVE issues the second route advertisement message with the updated sequence number and current next hop. Thus, there may be a period in which the NVEs have incorrect path information associated with that MAC/IP address in their MAC table.

Because of this, there may be a not insignificant amount of churn in the MAC tables in devices in the local data center, as the devices in the local data center may have to reprogram their MAC tables based on the route advertisement message with the incorrect path and based on the subsequent route advertisement message from the NVE with the correct next hop path and the updated sequence number. Moreover, traffic may be blackholed or otherwise significantly disrupted between the time the route advertisement message with the incorrect path is issued by the gateway and the time the NVE issues its second route advertisement message with the updated sequence number and the correct current next hop.

It may thus be desirable to further reduce these traffic disruptions and MAC table churn to both speed traffic delivery and decrease the use of processing resources on network devices. Embodiments may therefore force a (re) synchronization of sequence numbers associated with MAC/IP addresses across data centers when the movement of a host between data centers is detected.

In one embodiment, therefore, when a gateway detects a path conflict based on a received route advertisement message from a local NVE (e.g., the next hop path of the received route advertisement message from the NVE is a local path while the next hop path stored for the MAC/IP at the gateway is a remote path), the gateway may unsuppress that path or route as associated with that MAC/IP address. In addition, based on the detection of the path conflict, that the sequence number of the received route advertisement message is lower than sequence number stored in association with the MAC/IP address at the gateway, or that the sequence number of the received route advertisement message is zero, instead of sending a route advertisement message specifying the path and sequence number as currently existing at the gateway, a resyncing route advertisement message may be sent. The resyncing route advertisement message may be a specially marked route advertising message adapted to cause the synchronization of sequence numbers associated with the MAC/IP address of the route advertising message across NVEs in the data center.

This resyncing route advertisement message may advertise the MAC/IP address with the next hop path being set to the NVE from which the route advertisement was received (e.g., the path as was included in the received route advertisement message from the NVE in the local data center to which the host is now connected). Moreover, the sequence number included in the resyncing route advertisement message may be determined by incrementing the sequence number that is associated with the MAC/IP address at the gateway (e.g., the sequence number as received with the last route advertisement message received from the remote data center). The sequence number of the resyncing route advertisement message may thus be (e.g., one) greater than the highest sequence number of the last route advertisement message received from the remote data center. In some embodiments, however, the sequence number included in the resyncing route advertisement may just be copied from the remote domain path at the gateway while unsuppressing it. In addition, the path may be marked as "sequence-sync" (e.g., in the resyncing route advertisement message). In this manner, the onus of incrementing the sequence number and re-advertising the path with an incremented sequence number may be done at an NVE when it detects the "sequence-sync" path in the message.

The resyncing route advertisement may include a flag, signature or other synchronization indicator indicating that the resyncing route advertisement message is for use in synchronizing sequence numbers and that devices receiving the resyncing route advertisement message should only synchronize their sequence numbers and should not reprogram their MAC tables with the next hop information included in the resyncing route advertising message. This synchronization indicator may, for example, be included as a particular field value for an EVPN Extended Community (EC).

Accordingly, when an NVE in the data center receives such a resyncing route advertisement message, that NVE may identify the route advertisement message as a resyncing route advertisement message based on the resyncing indicator in the message (e.g., the signature in an EC of the resyncing route advertisement message). Here, the receiving NVE may update the sequence number in its MAC table associated with the MAC/IP address being advertised in the resyncing route advertisement message to the sequence number specified in the resyncing route advertisement without reprogramming the path information associated with that MAC/IP address at the NVE.

Additionally, the resyncing route advertisement message may be adapted to cause the NVE to which the host (MAC/IP) being advertised is connected to (re)advertise the path associated with that MAC/IP using the sequence number included in the resyncing route advertising message. Thus, in response to receiving this resyncing route advertising message, the NVE to which the host (MAC/IP) is connected can issue a route advertisement message with the local next hop path associated with the host's location at that NVE and the sequence number as included in the resyncing route advertisement.

The gateway in the local data center may receive this route advertisement message from the NVE. The gateway can then (re)advertise this route to gateways in the remote data center by sending a route advertisement message with this new path and sequence number to the gateway in the remote data center.

Turning now to FIG. 1, a block diagram depicting a general architecture of a network including an EVPN DCI network 100 in which UMR is implemented, where the network 100 includes an embodiment of gateways adapted for unsuppression of MAC/IP routes from remote data center based upon the movement of a host (MAC/IP). Here, one or more data centers 110a, 110b are interconnected through network 112 using DCI over EVPN. Each (EVPN) data center 110 may include computing devices that are physically remote from one another or may be a logical partition of computing resources on physical devices that are co-located. Data center 110 may include devices and networks for providing services or data to devices connected to the domain data center 110. In particular, each data center 110 may comprise one or more networks 120 implemented by network node devices 114 (e.g., provider edge (PE) devices). These PE devices (PEs) 114 may be, for example, TOR switches when networks of data centers 110 are a Clos architected domain (e.g., a leaf-spine network). Hosts 116 may connect to PEs 114 (e.g. either directly or indirectly, through a wired connection or a wireless connection, etc.) to access or provide applications, services or data through the local data center 110.

Data centers 110 are interconnected by network 112 through gateways 118 at each data center 110. Network 112 may be almost any computing network adapted to transmit data between these PEs such as the Internet, an internet, a Wide Area Network, a wireless or wired network, some combination of networks, etc. Accordingly, gateways 118 may provide an EVPN DCI network between data centers 110 such that data can be transported between data centers 110 (over network 112) as if data centers 110 were directly connected. From the standpoint of each gateway 118, PEs 114 and hosts 116 comprising the data center 110 to which it is connected (e.g., directly) may be that gateway's local data center 110 (e.g., data center 110a is gateway's 118a local data center while data center 110b is a remote data center from the viewpoint of gateway 118a).

UMR may be employed in network 100 (e.g., to avoid MAC scale issues on PEs 114). In addition, gateway policies may be employed on one or more of gateways 118 to disable (suppress) (re)advertisements of EVPN MAC/IP routes from a remote data center 110. In other words, if a MAC/IP address is suppressed by a gateway 118 and route advertisement messages are received at that gateway 118 from a remote data center 110 (e.g., a gateway 118 in that remote data center 110), those received route advertisements may not be (re) advertised by the gateway 118 in its local data center 110.

Here, gateways 118 may be adapted to unsuppress MAC/IP paths or routes suppressed through application of UMR or associated UMR policies in network 100 based on detection of a move of a host associated with the suppressed MAC/IP route from a remote data center 110 to a local data center 110. Specifically, according to one embodiment, the detection of a move of a host may be a detection of a conflict between a path stored for that MAC/IP at the gateway 118, and a path as received for that MAC/IP in a route advertisement message received at the gateway 118. In response to detection of this conflict the MAC/IP address may be unsuppressed. The unsuppression of the MAC/IP address may result in the synchronization of sequence numbers for that MAC/IP address within and across data centers 110.

Figure 2:
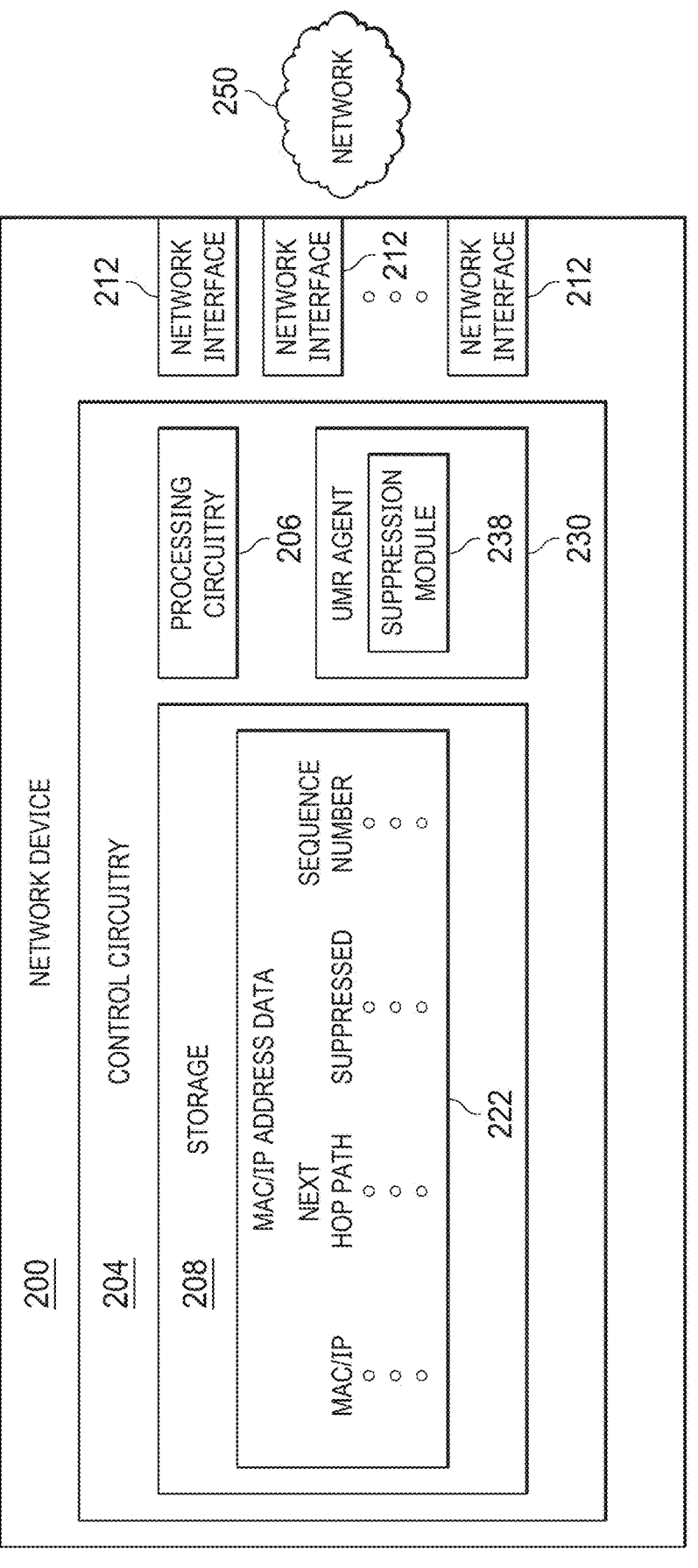
FIG. 2 is a block diagram of one embodiment of a network device for unsuppressing (or suppressing) routes or paths associated with MAC/IP addresses.
Figure 3A:
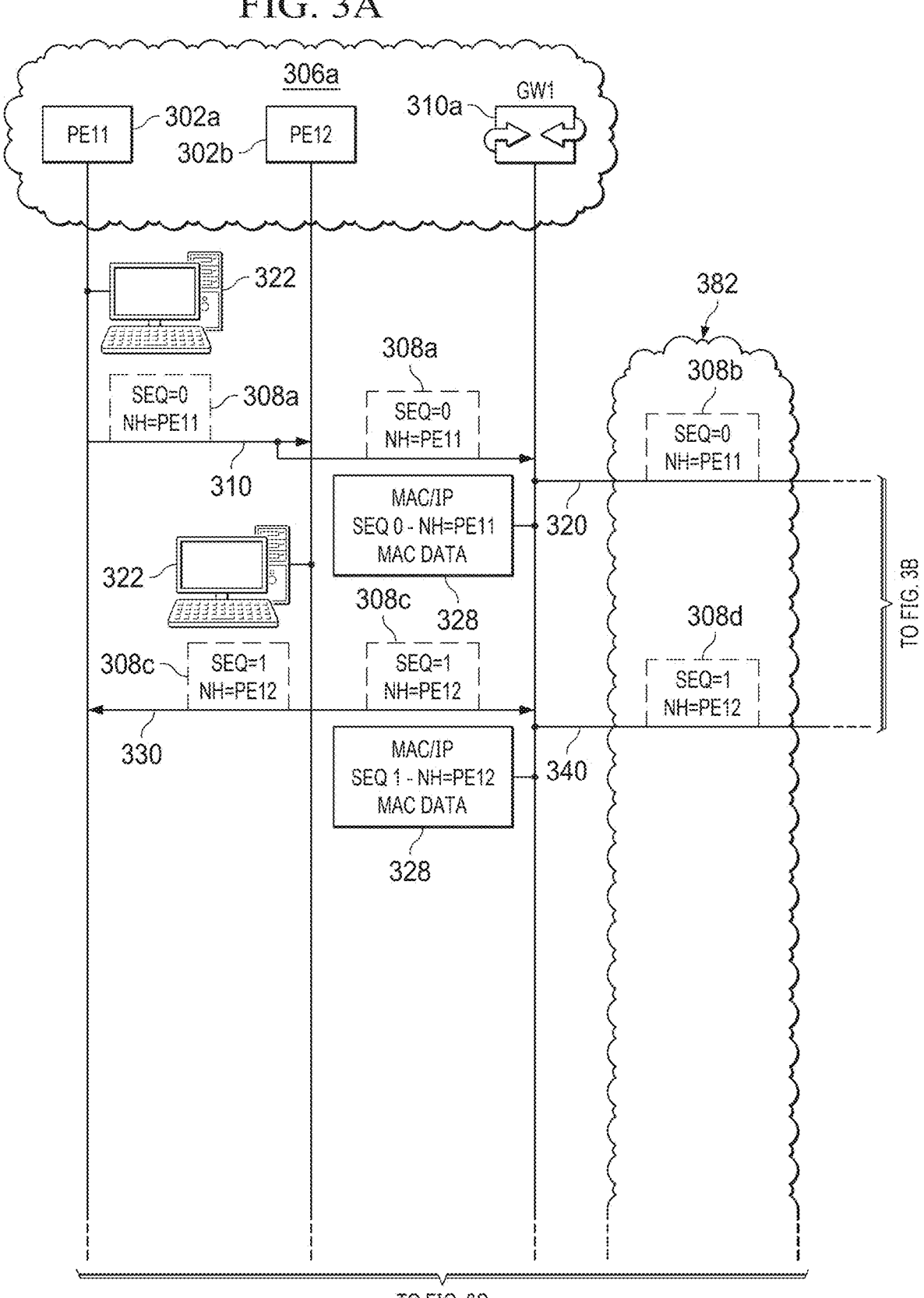
FIGS. 3A-3D (collectively FIG. 3) is a diagram of an example of using an embodiment of a gateway adapted to unsuppress routes or paths associated with MAC/IP addresses.
Figure 3B:
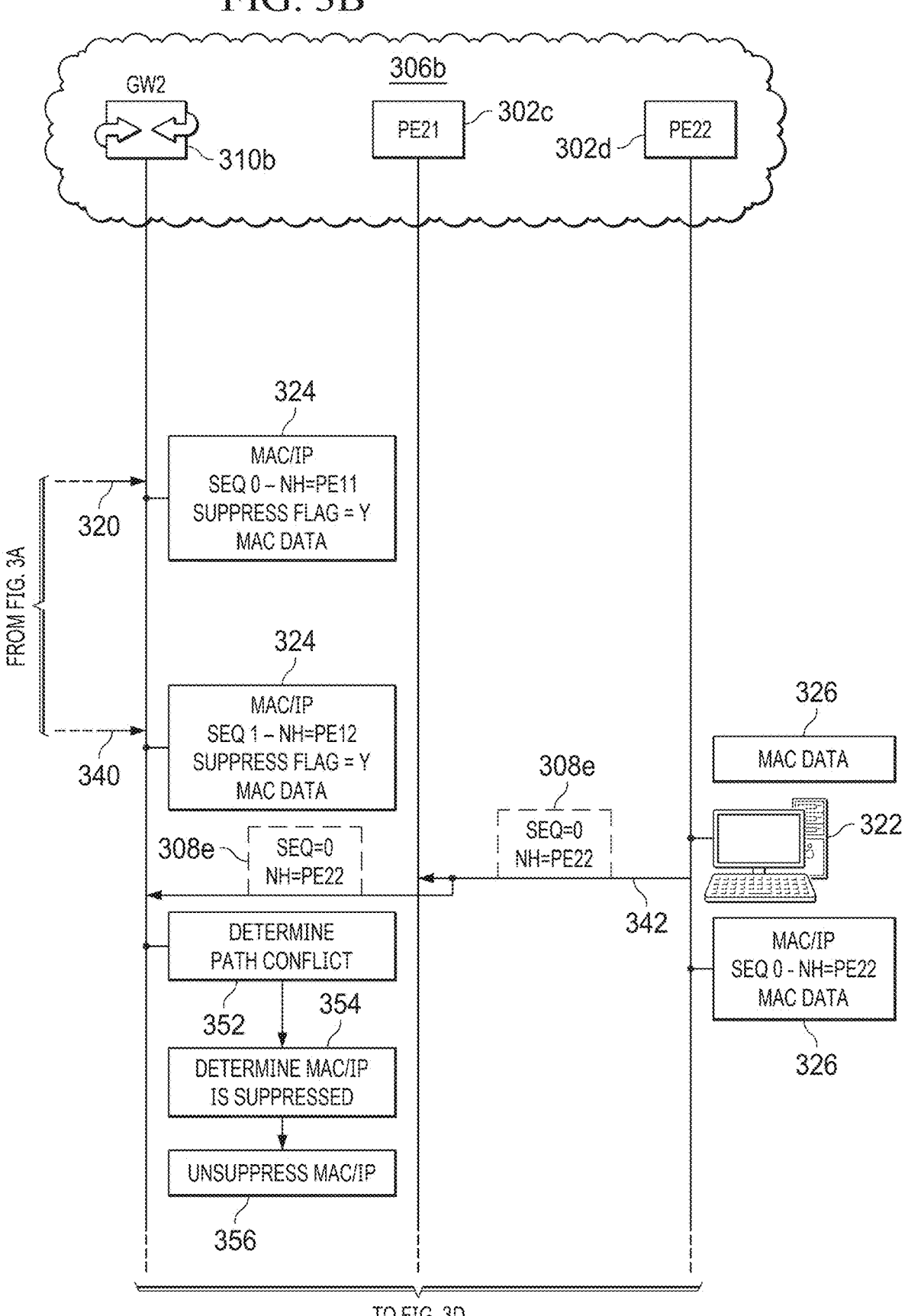
Figure 3C:
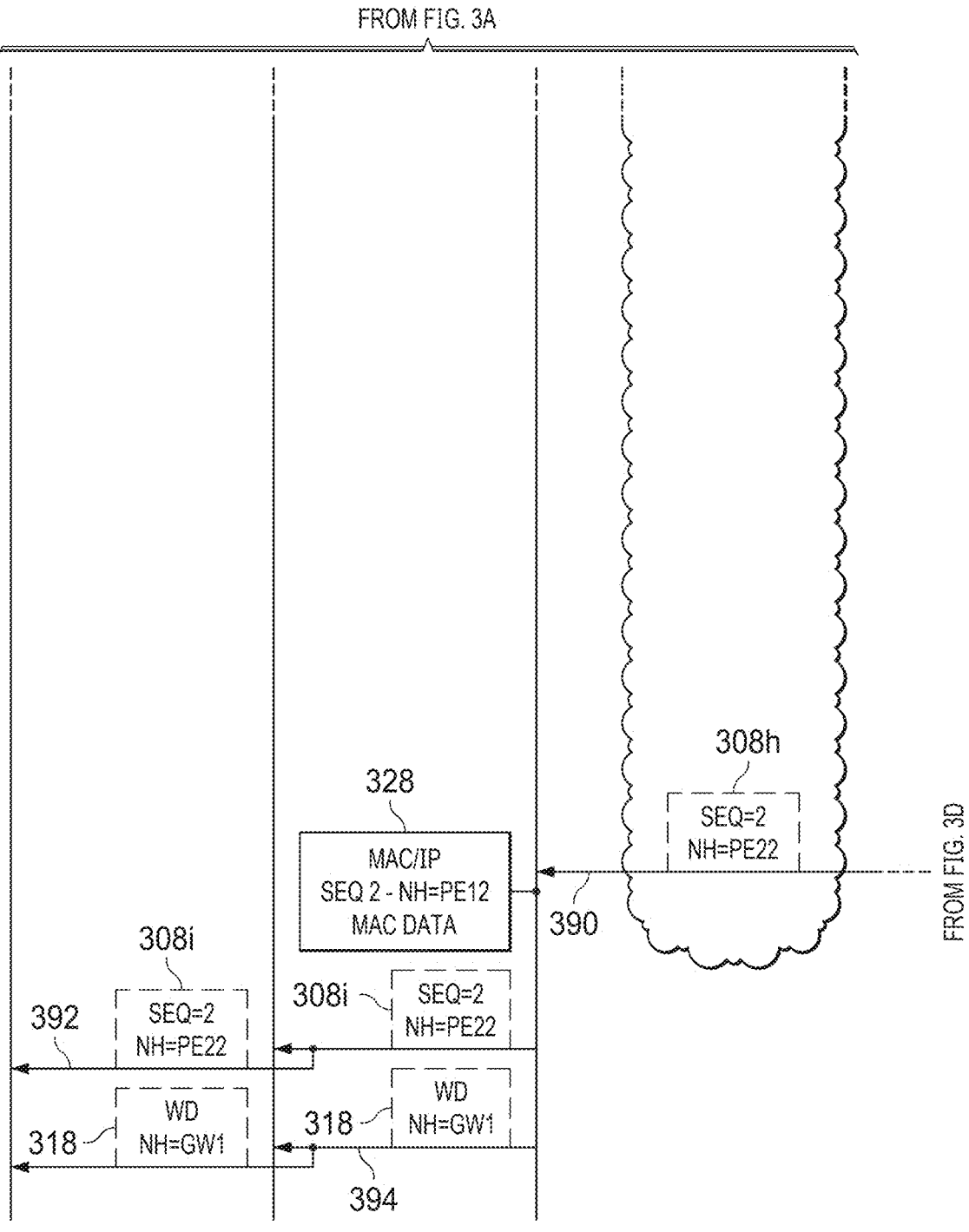
Figure 3D:
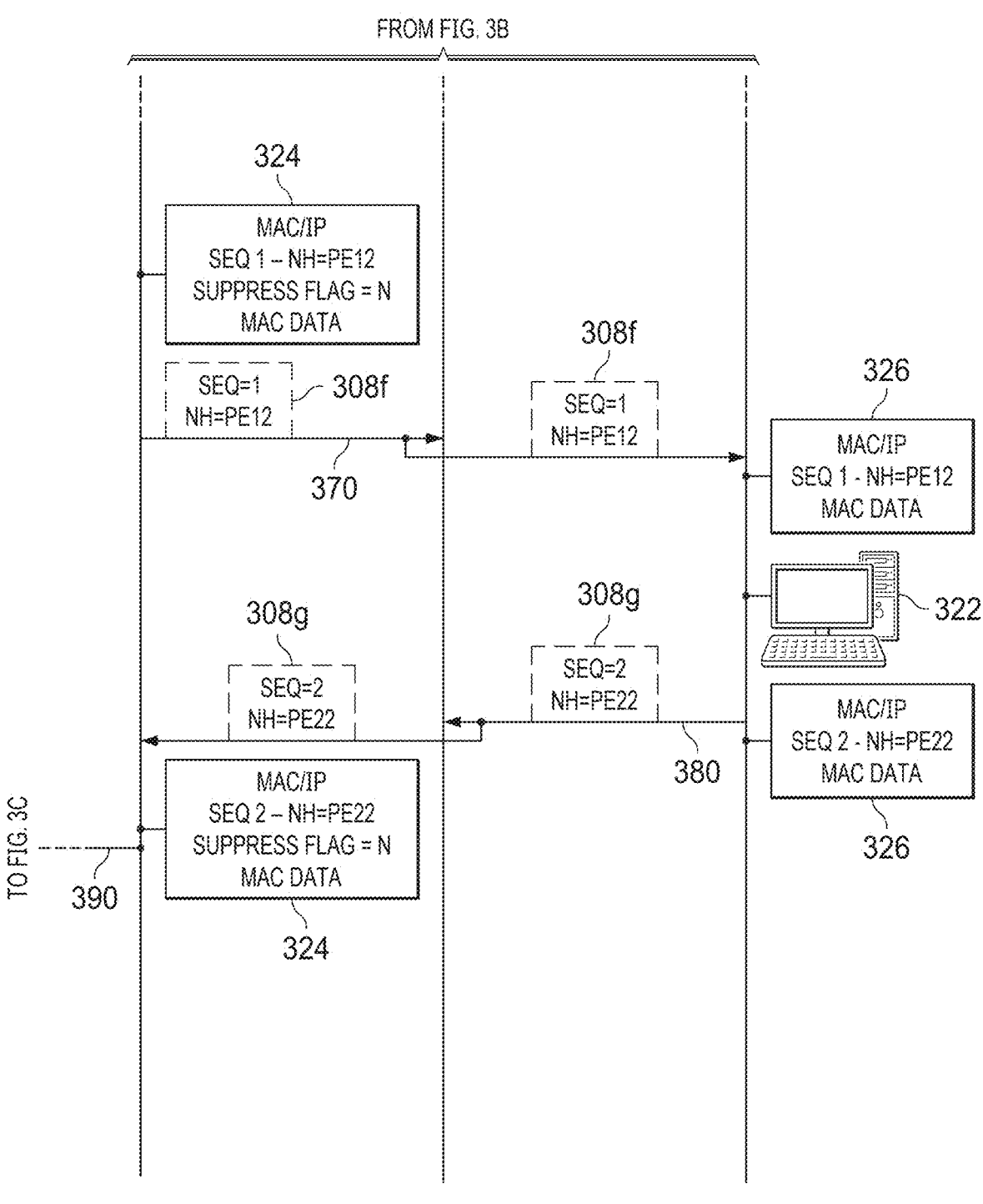
Figure 4A:
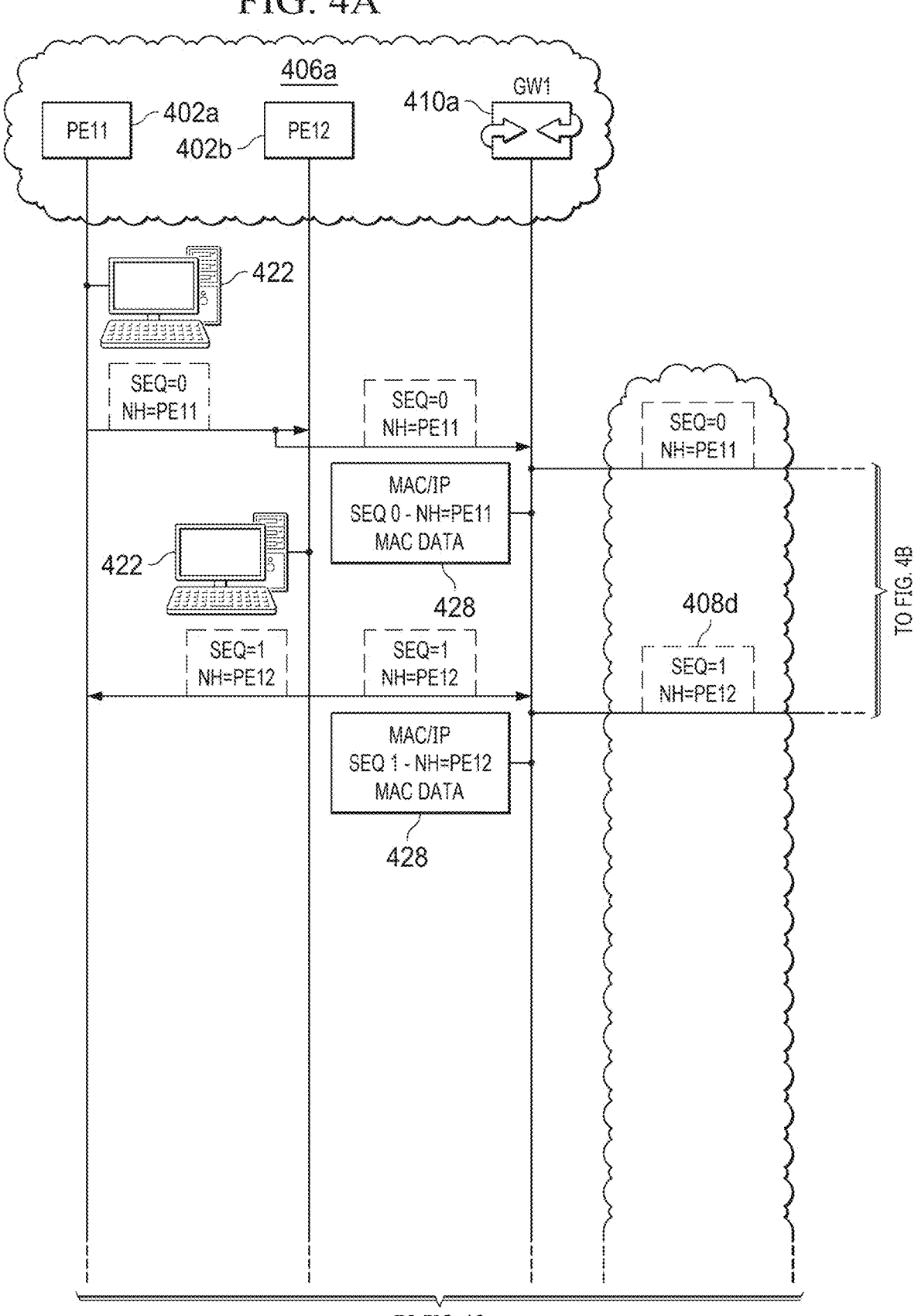
FIGS. 4A-4D (collectively FIG. 4) is a diagram of another example of using an embodiment of a gateway adapted to unsuppress routes or paths associated with MAC/IP addresses.
Figure 4B:
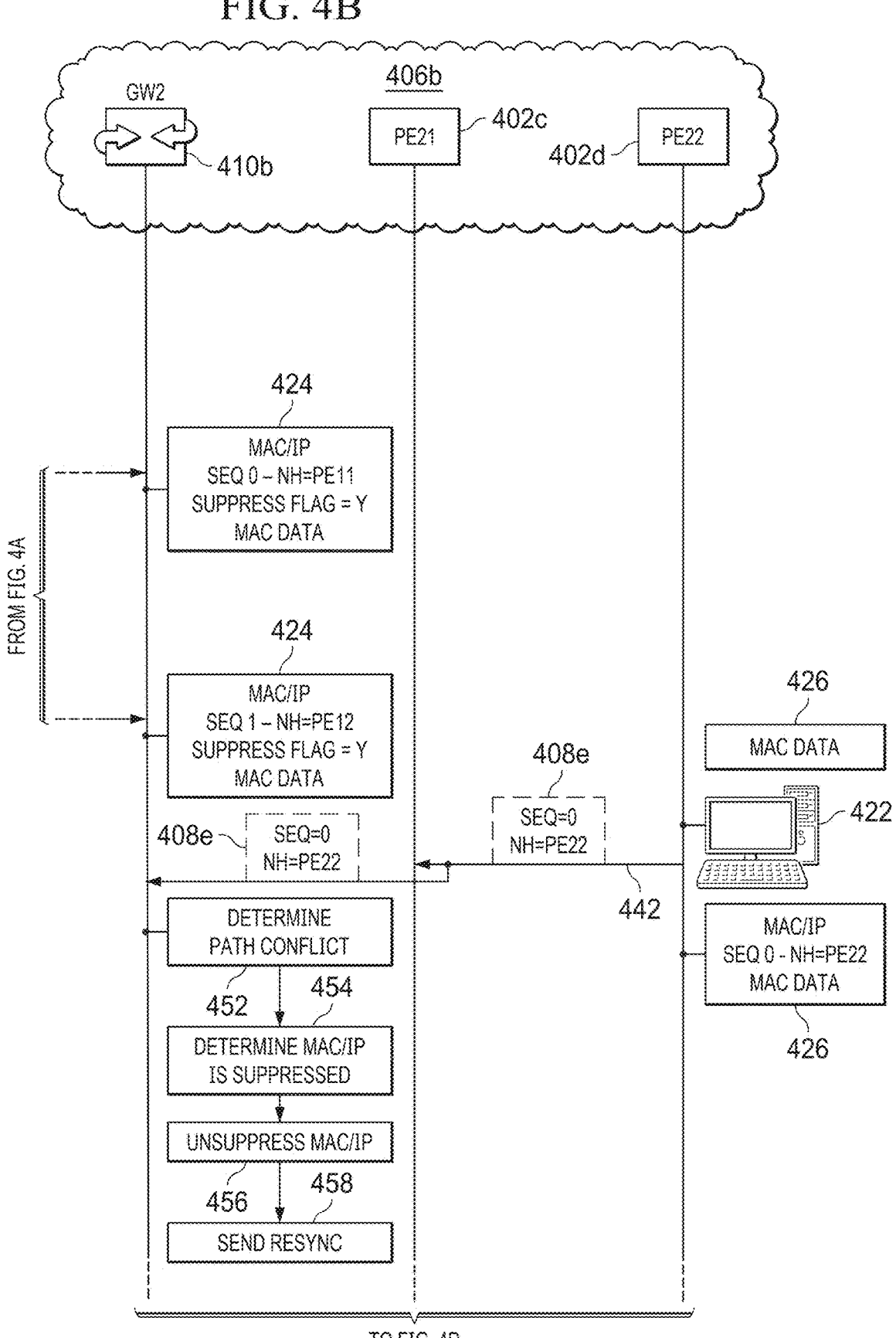
Figure 4C:
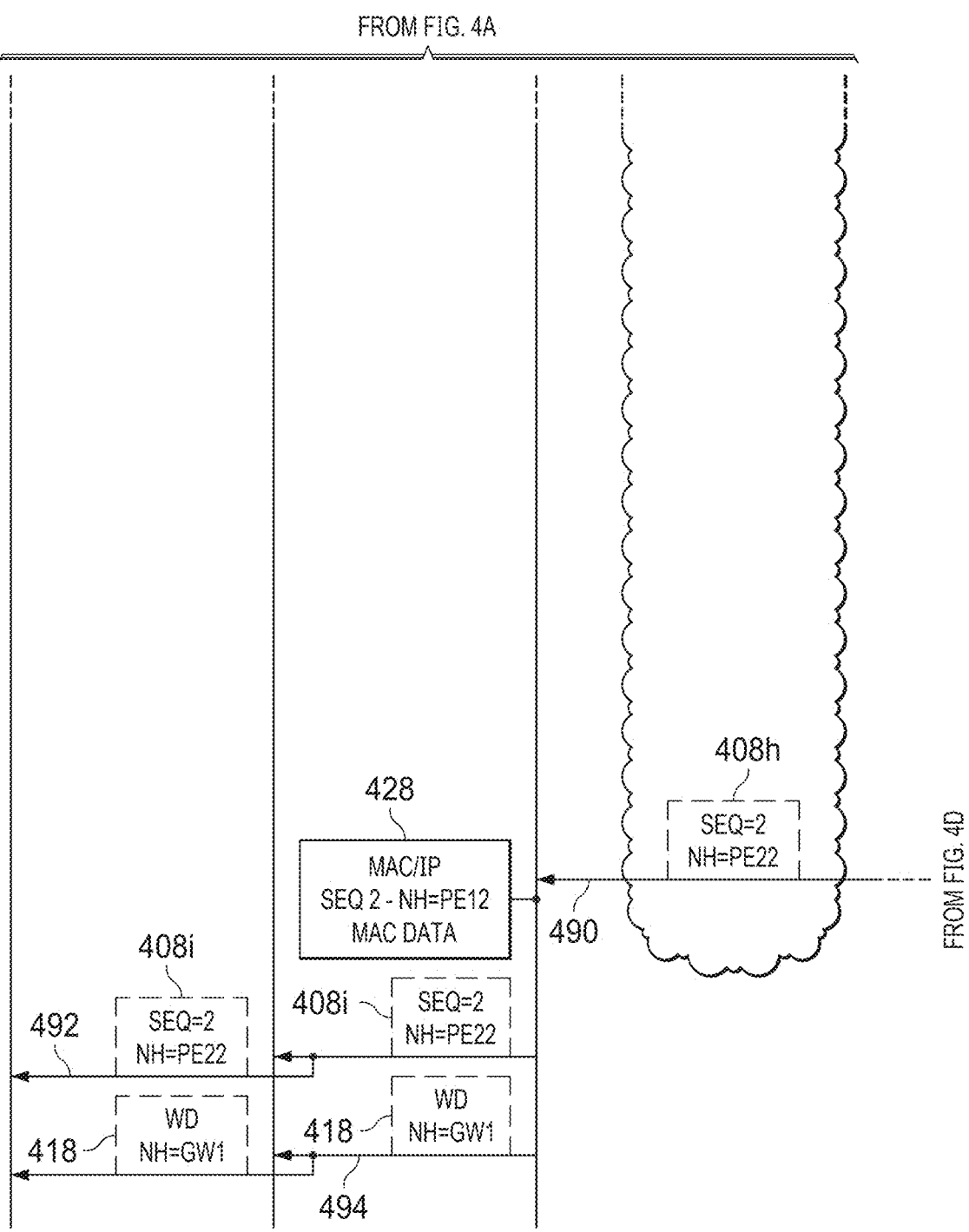
Figure 4D:
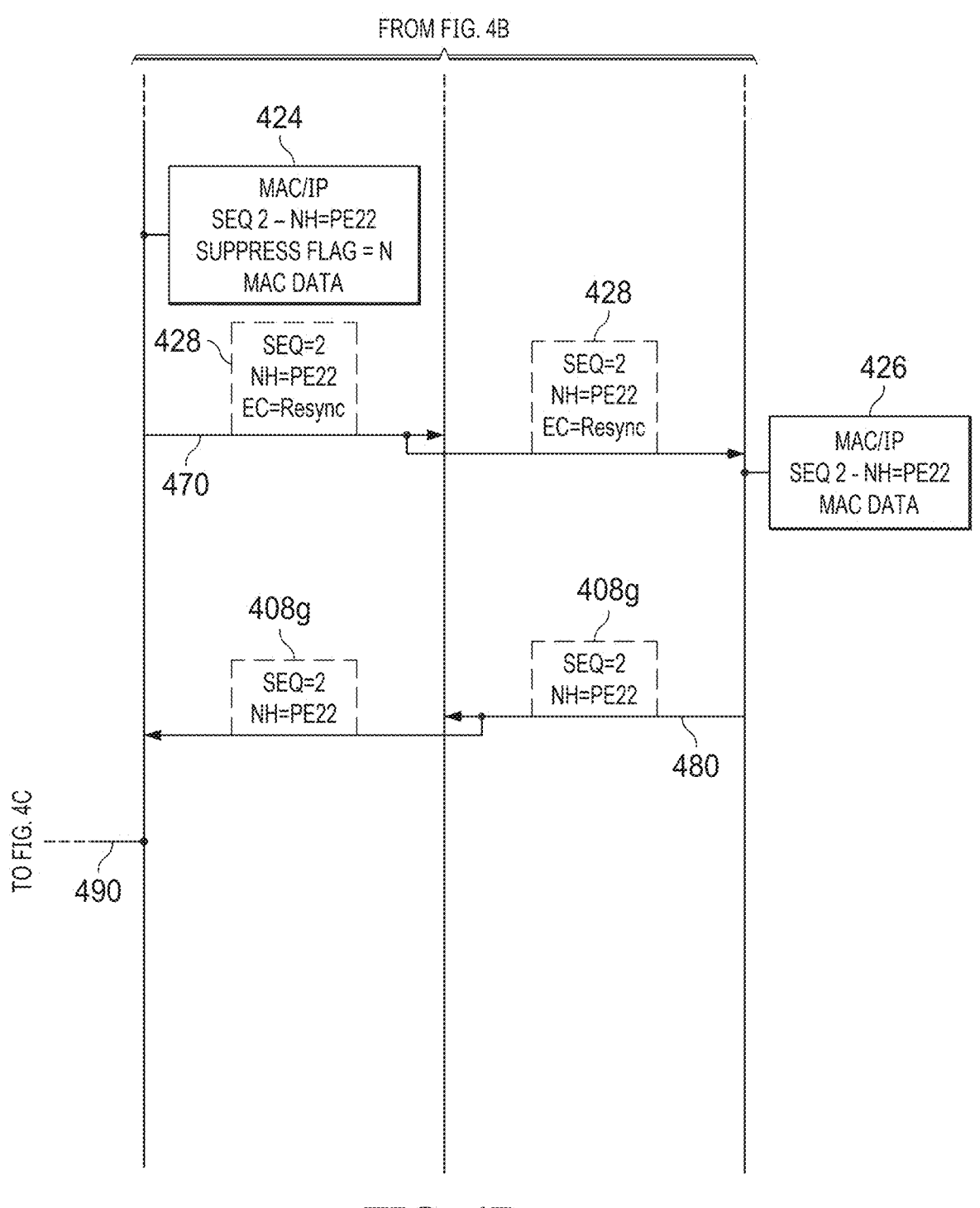

FIG. 2 depicts an architecture for one embodiment of a network device adapted for use in an EVPN DCI network employing UMR route and gateway policies for suppressing such routes where the network device is adapted to unsuppress routes or paths to avoid blackholing traffic or churning of MAC tables on devices within the network. Network device 200 may be a router, switch, server, or any other computing device that may be configured to control or process network traffic. The network device 200 may receive data, including network traffic (e.g., packets or the like), via an input/output (I/O) path. This I/O path may provide traffic data to control circuitry 204, which includes processing circuitry 206 and storage (i.e., memory) 208. Control circuitry 204 may send and receive commands, requests, and other suitable data using the I/O path where the I/O path may connect control circuitry 204 (and specifically processing circuitry 206) to one or more network interfaces 212 to which other devices of a network (e.g., routers or hosts, etc.) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) which does not retain its contents when power is turned off, and non-volatile memory, which does retain its contents when power is turned off. As referred to herein, the phrase "electronic storage device" or "storage device" or "memory" should be understood to mean any device for storing electronic data, computer software, instructions, or firmware, such as RAM, ROM, content-addressable memory (CAM) (including a TCAM), hard drives, optical drives, solid state storage devices, quantum storage devices, or any other suitable fixed or removable storage devices, or any combination of the same.

Network device 200 may be utilized as a gateway for a data center in an EVPN DCI network and may be adapted to implement UMR and suppress MAC/IP routes or paths in accordance with UMR gateway policies. When utilized in such a scenario, control circuitry 204 may execute instructions on processing circuitry 206 to adapt network device 200 to unsuppress MAC/IP routes or paths in certain circumstances. Accordingly, during operation in an EVPN DCI network employing UMR and UMR gateway policies for suppressing routes associated with a MAC/IP address, network device 200 may store MAC/IP address data 222 in storage 208. This data 222 may include MAC/IP addresses, a next hop path associated with each MAC/IP address, a sequence number associated with route advertising messages received for that MAC/IP address and a flag or other suppression indicator indicating if that MAC/IP address is currently suppressed.

UMR agent 230 on network device 200 (e.g., a set of instructions executing on control circuitry 204) may include a suppression module 238 adapted to disable the re(advertisement) of MAC/IP routes for a MAC/IP address if the suppression flag or other indicator in MAC/IP data 222 indicates that the MAC/IP address is being suppressed by the network device 200. Suppression module 238 may also be adapted to unsuppress a route or path associated with a MAC/IP address based on a path conflict between a next hop path stored in the MAC/IP address data 222 and a next hop path for that MAC/IP address as received in a route advertisement message.

Specifically, when a route advertisement message for a MAC/IP address is received at the network device 200 suppression module 238 may utilize the MAC/IP address specified in the received route advertisement message to access the MAC/IP data 222 at the network device 200 and determine that the next hop path specified in the received route advertisement message is a local path for that MAC/IP address (e.g., a route within a local data center of that network device), while the next hop path associated with that MAC/IP in the MAC data 222 at the gateway is a remote path (e.g., a route associated with a remote data center). The network device 200 can also determine that this MAC/IP address is suppressed at the network device 200 based on the suppression indicator associated with the MAC/IP address. Based on the determination of the path conflict (e.g., the next hop path of the received route advertisement message is a local path while the next hop path stored for the MAC/IP at the network device is a remote path), the network device may unsuppress that route or path associated with that MAC/IP (e.g., by setting the suppression indicator associated with the MAC/IP address to indicate that the MAC/IP address is not being suppressed). The unsuppression of the MAC/IP address may allow routes for that MAC/IP address to be (re)advertised by the network device 200 into the (local) data center for which network device 200 is being utilized as the gateway.

Accordingly, (e.g., based on a result of the comparison of the sequence number of the received route advertisement message and the sequence number as stored in MAC data 222 for that MAC/IP address) a route advertisement message may be sent (e.g., into the local data center) from the network device 200 for that MAC/IP address, where this route advertisement may be include, for example, the MAC/IP address, a current sequence number determined for the route advertisement message and a next hop path. For example, if the sequence number associated with the MAC/IP address in MAC data is greater than the sequence number of the received route advertisement message, the route advertisement message for the MAC/IP address may include as the current sequence number the sequence number as stored for the MAC/IP address in MAC data 222 and the advertised path for the MAC/IP may be the remote path as included in MAC data 222.

If, however, the sequence number associated with the MAC/IP address in MAC data 222 is equal to the sequence number of the received route advertisement message, a current or higher priority path between the remote path for the MAC/IP address as stored in MAC data 222 and the local path for the MAC/IP address as received in the route advertisement message may be determined. If the remote path for the MAC/IP address as stored in MAC data 222 is determined to be the winning path, the route advertisement message sent from the network device 200 for that MAC/IP address may include the MAC/IP address, a current sequence number (e.g., the sequence number as stored in MAC data 222 or incremented one from the stored sequence number), and the remote path. When the local path is determined to be the current or higher priority path, the route advertisement message sent from the network device 200 for that MAC/IP address may include the MAC/IP address, a current sequence number (e.g., the sequence number as stored in MAC data 222 or incremented one from the stored sequence number), and both the remote path and the local path (e.g., in different route advertisement messages).

In one embodiment, however, based on the detection of the path conflict, that a sequence number of the received route advertisement message is lower than (or equal to) the sequence number stored in association with the MAC/IP address in MAC data, or that the sequence number of the received route advertisement message is zero, instead of sending a route advertisement message specifying at least the remote path and a sequence number as currently existing at the gateway (or incremented therefrom), a resyncing route advertisement message may be sent by suppression module 238. The resyncing route advertisement may be a specially marked route advertising message adapted to cause the synchronization of sequence numbers associated with the MAC/IP address of the route advertising message across NVEs.

This resyncing route advertisement message may advertise the MAC/IP address, with the next hop path being set to the NVE from which the route advertisement was received (e.g., the path as was included in the received route advertisement message from the NVE in the local data center from which the route advertisement message was received). Moreover, the sequence number included in the resyncing route advertisement message may be determined by incrementing the sequence number that is associated with the MAC/IP address at the network device in MAC data 222 (e.g., the sequence number as received with the last route advertisement message received from a remote data center). The sequence number of the resyncing route advertisement message may thus be (e.g., one) greater than the highest sequence number of the last route advertisement message received from the remote data center.

Moreover, the resyncing route advertisement may include a flag, signature or other synchronization indicator indicating that the resynching route advertisement message is for use in synchronizing sequence numbers and that devices receiving the resynching route advertisement message should only synchronize their sequence numbers and should not reprogram their MAC tables with the next hop information included in the resyncing route advertising message. This synchronization indicator may, for example, be included as a particular field value for an EVPN Extended Community (EC).

Embodiments will be better understood with reference to FIG. 3, which depicts an example EVPN DCI network employing UMR and route suppression, where the EVPN DCI network includes an embodiment of gateways adapted to unsuppress routes or paths associated with MAC/IP addresses in response to detecting a path conflict. Specifically, assume for purposes of this example that an EVPN DCI network includes data centers 306a, 306b connected over network 382. Each data center 306 may include computing devices that are physically remote from one another or may be a logical partition of computing resources on physical devices that are co-located. In particular, data center 306a may include PE devices 302a (PE11) and 302b (PE12) (e.g., implementing a network within data center 306a), while data center 306b may include PE devices 302c (PE21) and 302d (PE22) (e.g., implementing a network within data center 306b). These PE devices (PEs) 302 may be, for example, (e.g., TOR) switches or the like. Hosts may connect to PEs 302 (e.g. either directly or indirectly, through a wired connection or a wireless connection, etc.) to access or provide applications, services or data through the data centers 306.

Data centers 306 are interconnected over network 308 through gateways 310a, 310b at each data center 306. Accordingly, gateways 310 may provide an EVPN DCI network between data centers 306 such that data can be transported between data centers 306 (over network 308) as if data centers 306 were directly connected. From the standpoint of each gateway 310a, 310b the PEs 302 and hosts comprising of the data center 306 to which it is connected (e.g., directly) may be that gateways local data center 306 (e.g., data center 306a is gateway (GW1) 310a's local data center while data center 306b is a remote data center from the viewpoint of gateway (GW1) 310a while data center 306b is gateway (GW2) 310b's local data center and data center 310a is a remote data center from the viewpoint of gateway (GW2) 310b).

For this example, suppose that host 322 (e.g., a physical or virtual device or other entity with a MAC/IP address) is initially connected to PE11 302a in data center 306a. Here, PE11 302a may send a route advertisement message 308a where that route advertisement message 308a may specify the MAC/IP address associated with host 322 and a sequence number of zero (e.g., as it is the first time that PE11 302a has seen this MAC/IP address) along with a next hop path specifying PE11 (STEP 310). This route advertisement message 308a will be received by gateway GW1 310a of data center 306a including PE11 302a. Because GW1 310a is in an EVPN DCI network with data center 310b, GW1 310a may (re)advertise this route for host 322 into data center 310b by sending route advertisement message 308b to GW2 310b where that route advertisement message 308b may the specify the MAC/IP address associated with host 322, the sequence number of zero and a next hop path specifying PE11 (STEP 320)

It will be noted here before proceeding further, that it will be realized that route advertisement message 308a will also be received by PE12 302b in data center 306a and that all of PE11 302a, PE12 302b and GW1 310a may program their MAC tables according to the sequence number and next hop path included in route advertisement message 308a However, for ease of depiction the reception of such route advertisement messages at each of the entities of the example and the respective programming of those entities' MAC tables will not be depicted or described in detail.

When GW2 310b receives route advertisement message 308b GW2 310b may update its MAC data 324 based on the received route advertisement message 308b by including that MAC/IP address of host 322 along with the remote next hop (from the point of view of GW2 310b) including PE11 and the zero sequence number of the received route advertisement message. Additionally, in accordance with UMR, and any UMR gateway policies at GW2 310b, GW2 310b may suppress the (routes or paths associated with that) MAC/IP address for host 322 in its local data center 306b. Thus, GW2 may store a suppression indicator indicating that the MAC/IP address of host 322 is currently suppressed.

Now suppose that host 322 moves from PE11 302a in data center 306a to PE12 in data center 306a. In accordance with this move, PE12 302b may send a route advertisement message 308c where that route advertisement message 308c may specify the MAC/IP address associated with host 322 and a next hop path specifying PE12 (STEP 330). Because PE12 302b MAC table include the information programmed based on the previous reception of route advertisement message 308a, the sequence number of that previous route advertisement message 308a may be incremented such that the sequence number of route advertisement message 308c sent from PE12 302b may now be one.

The route advertisement message 308c sent by PE12 302b will be received by gateway GW1 310a of data center 306a including PE12 302b. Because GW1 310a is in an EVPN DCI network with data center 310b, GW1 310a may (re) advertise this (new) route for host 322 into data center 310b by sending route advertisement message 308d to GW2 310b where that route advertisement message 308d may specify the MAC/IP address associated with host 322, the sequence number of one and a next hop path specifying PE12 (STEP 340)

When GW2 310b receives route advertisement message 308d, GW2 310b may update its MAC data 324 based on the received route advertisement messages by updating the next hop associated with MAC/IP of host 322 to the remote next hop (from the point of view of GW2 310b) including PE12 and the one sequence number of the received route advertisement message 308d. Here, because the MAC/IP address for host 322 is suppressed in GW2 310b's local data center 306b, GW2 310 will not (re)advertise the MAC/IP route in data center 306b.

Now further suppose that host 322 is migrated to data center 306b by connecting host 322 to PE22 302d. As routes for the MAC/IP of host 322 are suppressed in data center 306b (e.g., by GW2 310b), PE22 302d may determine that a new host has been connected (e.g., the MAC/IP address of host 322 may not be included in MAC data 326 of PE22 302d). Accordingly, PE22 302d may send a route advertisement message 308e where that route advertisement message 308e may specify the MAC/IP address associated with host 322 and a sequence number of zero (e.g., as it is the first time that PE22 302d has seen this MAC/IP address) along with a next hop path specifying PE22 (STEP 342). This route advertisement message 308e will be received by gateway GW2 310b of data center 306b including PE22 302d.

When GW2 310b receives route advertisement message 308e, GW2 310b may utilize the MAC/IP address specified in the received route advertisement message 308e to access MAC data 324 at GW2 310b to determine that there is a path conflict (STEP 352). Specifically, GW2 310b may determine that the next hop path specified in the received route advertisement message 308e is a local path (e.g., the path is associated with PE22 302d within GW2 310b's local data center 306b) while the next hop information associated with the MAC/IP for host 322 in MAC data 324 at GW2 310b is associated with a remote path (e.g., the path is associated with PE12 302b in remote data center 306a).

GW2 310b can also determine that the (route or path associated with) MAC/IP address of route advertisement message 308d is suppressed (e.g., is a suppressed remote data center path) at GW2 310b (e.g., in accordance with a UMR gateway policy) based on suppression data associated with the MAC/IP address in MAC data 324 at GW2 310b (STEP 354). Based on the determination of the path conflict (e.g., the next hop path of the received route advertisement message is a local path while the next hop path stored for the MAC/IP in MAC data 324 at GW2 310b is a remote path), the GW2 310b may unsuppress a route or path associated with the MAC/IP address associated with host 322 (e.g., allow (re)advertisement of EVPN MAC/IP routes for the MAC/IP address of host 322 in GW2 310b's local data center 306b) (STEP 356). GW2 310b can update MAC data 324 to reflect the unsuppression of this MAC/IP address. In this manner, embodiments may enable (e.g., automatic) unsuppression of MAC/IP addresses based upon the movement of a host (MAC/IP) (e.g., where those MACIP routes would usually otherwise remain suppressed).

GW2 310b may also evaluate the sequence number of the received route advertisement message 308e (zero) against the sequence number (one) associated with the MAC/IP address of host 322 as stored in MAC data 324. Again, because the MAC/IP address was suppressed in data center 306b, the route advertisement message 308e sent by PE22 302d may have a sequence number of zero. Accordingly, when GW2 310b evaluates the sequence number of the received route advertisement 308e it will compare this sequence number of zero in the route advertisement message 308e received from PE22 302d with the sequence number of the last route advertisement message 308d received by the GW2 310b as stored in association with the MAC/IP address in MAC data 324 at GW2 310b, in this case a sequence number of one.

Based on this comparison, GW2 310b may determine that the sequence number stored in association with the MAC/IP address in MAC data 324 at GW2 310b (one) is greater than the sequence number as included in the route advertisement message 308e received from the PE22 302d (zero). As a result of this determination, GW2 310b may send route advertisement message 308f for the MAC/IP address of host 322 (STEP 370), where this route advertisement message 308f may include this greater sequence number (e.g., one, as stored in association with the MAC/IP address of the host 322 at GW2 310b) and specifying the current (remote) next hop path for the MAC/IP address of host 322 as included in MAC data 324 (e.g., the path associated with PE12 302b in remote data center 306a).

When PE22 302d in data center 306b receive this route advertisement message 308f from GW2 310b, as the sequence number (one) of this route advertisement message 308f is greater than the current sequence number (zero) for that MAC/IP address in MAC data 326 at PE22 302d, PE22 302d may update their MAC data 326 to the sequence number (one) and the path (e.g., the remote path associated with PE12 302b) included in the route advertisement message 302f sent from GW2 310b. PE22 302d to which host 322 is connected may thus now have a path associated with the MAC/IP of that host 322 that is a remote path associated with PE12 302b.

Accordingly, when PE22 302d to which host 322 is now connected in data center 306b again receives traffic from that host 322, PE22 302d may detect that the current location of the host 322 (MAC/IP) connected to PE22 302d is different than the current path associated with the MAC/IP address of host 322 in MAC data 326 of PE22 302d. Based on such a detection, the PE22 302d may store a new path associated with PE22 302d in MAC data 326 at PE22 302d. PE22 302d can then issue route advertisement message 308g with the next hop path associated with PE22 with an incremented sequence number (two, one more than the sequence number of one stored in MAC data 326) (STEP 380). This incremented sequence number (two) may also be stored in association with the MAC/IP of host 322 in MAC data 326.

GW2 310b in data center 306b may receive this route advertisement message 308g from PE22 302d. Here, when GW2 310b evaluates the sequence number of route advertisement message 308g it will compare the sequence number in the received route advertisement message 308g (two) with the sequence number as stored in association with the MAC/IP address in MAC data 324 at GW2 310b (e.g., one, the sequence number of the last route advertisement message 308d sent by GW1 310a).

Based on this comparison, the GW2 310b may determine that the sequence number (one) stored in MAC data 324 in association with the MAC/IP address of the host 322 is less than the sequence number (two) as included in the route advertisement message 308g received from PE22 302d. As a result of this determination, GW2 310b can determine the received route advertisement message 308g is most current and store the path for host 322 associated with PE 302d specified in route advertisement message 308g in its MAC data 324 along with the sequence number (two) of the received route advertisement message 308g.

Because GW2 310b is in an EVPN DCI network with data center 306a, GW2 310b may (re)advertise the path including PE22 302d for host 322 into data center 310a by sending route advertisement message 308h to GW1 310a, where that route advertisement message 308h may specify the MAC/IP address associated with host 322, the current sequence number (two) and a next hop path specifying PE22 302d (STEP 390). GW1 310a of data center 306a will receive route advertisement message 308h and determine that the path as specified in MAC data 328 of GW1 310a for the MAC/IP address of route advertisement message 308h is a local path with respect to GW1 310a (e.g., the path is associated with local PE12 302b) while the path specified in the route advertisement message 308h for that MAC/IP is a remote path (e.g., associated with data center 306b), or that the sequence number of the received route advertisement message 308h (two) is greater than the sequence number (one) as stored in association with the MAC/IP address of host 322 in MAC data 328 at GW1 310a. Thus, GW1 310a may update its MAC data 328 with the route as included in the received route advertisement message 308h along with the new sequence number (two). Moreover, GW1 310a will also re(advertise) this new route for the MAC/IP of host 322 (associated with PE22 302d) into data center 306a using route advertisement message 308i with the most current sequence number (two). Thus, devices in both data centers 306 will now have the correct path information and a synchronized sequence number for the MAC/IP of host 322, despite the movement of host 322 between data centers 306.

At some point, GW1 310*a*, in accordance with the implementation of UMR and any UMR gateway policy specifying suppression of such routes, may issue a withdrawal 318 of this MAC/IP and (e.g., with the most current sequence number) in data center 306*a* (STEP 394).

It will be noted that, while eventually avoiding blackholing (e.g., dropping) of traffic, the synchronization of the MAC tables across devices in data center 306 may cause churn of the various MAC data on devices in the data centers 306, consuming processing resources and blackholing or further delaying the delivery of traffic in the interim. It is thus desirable to further reduce these traffic disruptions and MAC data churn to both speed traffic delivery and decrease the use of processing resources on network devices. Embodiments may therefore force a (re)synchronization of sequence numbers associated with MAC/IP addresses across data centers when the movement of a host between data centers is detected.

Referring then to FIG. 4 depicts an example EVPN DCI network employing UMR, and route suppression is depicted, where the EVPN DCI network includes an embodiment of gateways adapted to unsuppress routes or paths associated with MAC/IP addresses in response to detecting a path conflict and force synchronization of sequence numbers for MAC/IP addresses. Here, the operation of PEs 402 and GWs 410 initially operates substantially similarly to that depicted in FIG. 3.

So, picking up in FIG. 4 where host 422 is migrated to data center 406*b* by connecting host 422 to PE22 402*d*. As routes for the MAC/IP of host 422 are suppressed in data center 406*b* (e.g., by GW2 410*b*), PE22 402*d* may determine that a new host has been connected (e.g., the MAC/IP address of host 422 may not be included in MAC data 426 of PE22 402*d*). Accordingly, PE22 402*d* may send a route advertisement message 408*e* where that route advertisement message 408*e* may specify the MAC/IP address associated with host 422 and a sequence number of zero (e.g., as it is the first time that PE22 402*d* has seen this MAC/IP address) along with a next hop path specifying PE22 402*d* (STEP 442). This route advertisement message 408*e* will be received by gateway GW2 410*b* of data center 406*b* including PE22 402*d*.

When GW2 410*b* receives route advertisement message 408*e*, GW2 410*b* may utilize the MAC/IP address specified in the received route advertisement message 408*e* to access MAC data 424 at GW2 410*b* to determine that there is a path conflict (STEP 452). Specifically, GW2 410*b* may determine that the next hop path specified in the received route advertisement message 408*e* is a local path (e.g., the path is associated with PE22 402*d* within GW2 410*b*'s local data center 406*b*) while the next hop information associated with the MAC/IP for host 422 in MAC data 424 at GW2 410*b* is associated with a remote path (e.g., the path is associated with PE12 402*b* in remote data center 406*a*).

GW2 410*b* can also determine that the MAC/IP address of route advertisement message 408*e* is suppressed (e.g., is a suppressed remote data center path) at GW2 410*b* (e.g., in accordance with a UMR gateway policy) based on suppression data associated with the MAC/IP address in MAC data 424 at GW2 410*b* (STEP 454). Based on the determination of the path conflict (e.g., the next hop path of the received route advertisement message is a local path while the next hop path stored for the MAC/IP in MAC data 424 at GW2

410*b* is a remote path), the GW2 410*b* may unsuppress a route or path associated with the MAC/IP associated with host 422 (e.g., allow (re)advertisement of EVPN MAC/IP routes for the MAC/IP address of host 422 in GW2 410*b*'s local data center 306*b*) (STEP 456). GW2 410*b* can update MAC data 424 to reflect the unsuppression of this MAC/IP address.

GW2 410*b* may also evaluate the sequence number of the received route advertisement message 408*e* (zero) against the sequence number (one) associated with the MAC/IP address of host 422 as stored in MAC data 424. Accordingly, when GW2 410*b* evaluates the sequence number of the received route advertisement 408*e* it will compare this sequence number of zero in the route advertisement message 408*e* received from PE22 402*d* with the sequence number of the last route advertisement message 408*d* received by the GW2 410*b* as stored in association with the MAC/IP address in MAC data 424 at GW2 410*b*, in this case a sequence number of one.

Based on this comparison, GW2 410*b* may determine that the sequence number stored in association with the MAC/IP address in MAC data 424 at GW2 410*b* (one) is greater than the sequence number as included in the route advertisement message 408*e* received from the PE22 402*d* (zero). Based on the detection of the path conflict, that the sequence number of the received route advertisement message is lower than sequence number stored in association with the MAC/IP address at the gateway, or that the sequence number of the received route advertisement message 408*e* is zero, instead of sending a route advertisement message specifying the path and sequence number as currently existing at GW2 410*b*, GW2 410*b* may determine that a resyncing route advertisement message should be sent (STEP 458). The resyncing route advertisement may be a specially marked route advertising message adapted to cause the synchronization of sequence numbers associated with the MAC/IP (e.g., of host 422) across data center(s) 406.

In one embodiment, therefore, GW2 410*b* may increment the sequence number currently associated with the MAC/IP of host 422 (e.g., in MAC data 424), in this case from one to two. Additionally, GW2 410*b* may update the path associated with the MAC/IP of host 422 (e.g., in MAC data 424) to be the (e.g., local) path included in route advertisement message 408*e* received from the local PE 402*d* (here, the path including PE22 402*d*).

GW2 410*b* can then send resyncing route advertisement message 428 advertising MAC/IP address of host 422 with the path being set to the path including PE22 402*d* (as received in route advertisement message 408*e* from PE22 402*d*) (STEP 470). Moreover, the sequence number included in the resyncing route advertisement message 428 is the incremented sequence number (two) determined and stored in MAC data 424 at GW2 410*b*. The sequence number of the resyncing route advertisement message 428 (two) may thus be greater than the highest sequence number (one) of the last route advertisement message 408*d* received from the data center 406*a*.

Resyncing route advertisement message 428 may also include a flag, signature or other synchronization indicator indicating that the resyncing route advertisement message 428 is for use in synchronizing sequence numbers and that devices receiving the resyncing route advertisement message 428 should only synchronize their sequence numbers and should not reprogram their MAC data (e.g., 426) with any next hop information included in the resyncing route advertising message 428. This synchronization indicator may, for example, be included as a particular field value for an EVPN EC.

When PEs 402*c*, 402*d* in data center 406*b* receive such a resyncing route advertisement message 428, PE 402 may identify the route advertisement message 428 as a resyncing route advertisement message based on the resyncing indicator in the message (e.g., the signature in an EC of the resyncing route advertisement message). Here, each receiving PE 402 may update the sequence number in its MAC data (e.g., MAC data 426) associated with the MAC/IP address of host 422 being advertised in the resyncing route advertisement message 422 to the sequence number specified in the resyncing route advertisement 428 (two) without reprogramming the path information associated with that MAC/IP address at the PE 402.

Additionally, the resyncing route advertisement message 428 may be adapted to cause PE22 402*d* to which the host 422 (e.g., whose MAC/IP is being advertised) is connected to (re)advertise the (e.g., local) path associated with that MAC/IP using the sequence number included in the resyncing route advertising message 428. Thus, in response to receiving this resyncing route advertising message 428, PE22 402*d* can issue route advertisement message 408*g* with the next hop path associated with PE22 and the sequence number (two) as received in the resyncing route advertisement message 428) (STEP 480).

GW2 410*b* in data center 406*b* may receive this route advertisement message 408*g* from PE22 402*d*. Here, when GW2 410*b* evaluates the sequence number of route advertisement message 408*g* it will compare the sequence number in the received route advertisement message 408*g* (two) with the sequence number as stored in association with the MAC/IP address in MAC data 424 at GW2 410*b* (e.g., two, the sequence number of the last route advertisement message received from GW1 410*a*).

Because GW2 410*b* is in an EVPN DCI network with data center 406*a*, GW2 410*b* may (re)advertise the path including PE22 402*d* for host 422 into data center 410*a* by sending route advertisement message 408*h* to GW1 410*a*, where that route advertisement message 408*h* may specify the MAC/IP address associated with host 422, the current sequence number (two) and a next hop path specifying PE22 402*d* (STEP 490). GW1 410*a* of data center 406*a* will receive route advertisement message 408*h* and determine that the path as specified in MAC data 428 of GW1 410*a* for the MAC/IP address of route advertisement message 408*h* is a local path with respect to GW1 410*a* (e.g., the path is associated with local PE12 402*b*) while the path specified in the route advertisement message 408*h* for that MAC/IP is a remote path (e.g., associated with data center 406*b*), or that the sequence number of the received route advertisement message 408*h* (two) is greater than the sequence number (one) as stored in association with the MAC/IP address of host 422 in MAC data 428 at GW1 410*a*. Thus, GW1 410*a* may update its MAC data 428 with the route as included in the received route advertisement message 408*h* along with the new sequence number (two). Moreover, GW1 410*a* will also re(advertise) this new route for the MAC/IP of host 422 (associated with PE22 402*d*) into data center 406*a* using route advertisement message 408*i* with the most current sequence number (two). Thus, devices in both data centers 406 will now have the correct path information and a synchronized sequence number for the MAC/IP of host 422, despite the movement of host 422 between data centers 406.

At some point, GW1 410*a*, in accordance with the implementation of UMR and any UMR gateway policy specifying suppression of such routes, may issue a withdrawal 418 of this MAC/IP and (e.g., with the most current sequence number) in data center 406*a* (STEP 494).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:

receiving a first route advertising message from a Provider Edge (PE) device at a gateway of a first data center in an Ethernet Virtual Private Network (EVPN) Data Center Interconnect (DCI) Network using Unknown MAC Route (UMR), wherein the PE device is in the first data center of the gateway and the first route advertising message specifies a MAC/IP address and a first path for the MAC/IP address associated with the MAC/IP at the PE, and wherein the gateway has suppressed remote paths for the MAC/IP address in the first data center;

determining, at the gateway, a conflict between the first path for the MAC/IP address as received in the first route advertisement message and a second path for the MAC/IP address as stored in MAC data at the gateway;

determining that remote paths for the MAC/IP address are suppressed at the gateway; and unsuppressing remote paths for the MAC/IP address at the gateway, wherein the unsuppression of remote paths for the MAC/IP address at the gateway results in the gateway sending a second route advertisement for the MAC/IP address in the first data center, wherein the second route advertisement message specifies a third path for the MAC/IP address.

2. The method of claim 1, wherein determining the conflict between the first path and the second path comprises determining the first path is a local path in the first data center and the second path is a remote path associated with a second data center.

3. The method of claim 2, wherein the second route advertisement message is sent based on a determination that a first sequence number included in the first route advertisement message is less than, or equal to, a second sequence number stored for the MAC/IP address in the MAC data at the gateway.

4. The method of claim 3, wherein the third path is the same as the second path when the second sequence number is greater than the first sequence number.

5. The method of claim 4, wherein the second path and second sequence number associated with the MAC/IP address in the MAC data at the gateway was previously received in a third route advertisement message from the second data center.

6. The method of claim 3, wherein the third path comprises the first path and the second path when the first sequence number is equal to the second sequence number.

7. The method of claim 1, wherein the second route advertisement message is a resyncing route advertisement message including a synchronization indicator and a third sequence number greater than a second sequence number associated with the MAC/IP address at the gateway.

8. The method of claim 7, wherein the resyncing route advertisement message is sent based on a determination that a first sequence number is zero.

9. The method of claim 7, wherein the synchronization indicator is in an Extended Community (EC) field.

10. The method of claim 7, wherein the synchronization indicator of the resyncing route advertisement message is adapted to cause the PE to update the second sequence number associated with the MAC/IP address at the PE with the third sequence number without updating the first path for the MAC/IP address associated with the MAC/IP address at the PE.

11. The method of claim 10, wherein the PE sends a third route advertisement message based on receipt of the resyncing router advertisement, wherein the third route advertisement message includes the third sequence number and the first path for the MAC/IP address associated with the MAC/IP address at the PE.

12. A system in an Ethernet Virtual Private Network (EVPN) Data Center Interconnect (DCI) Network using Unknown MAC Route (UMR), comprising:

a gateway coupled to a PE device in a first data center, the gateway adapted for:

receiving a first route advertising message specifying a MAC/IP address and a first path for the MAC/IP address associated with the MAC/IP address at the PE, and wherein the gateway has suppressed remote paths for the MAC/IP address in the first data center;

determining a conflict between the first path for the MAC/IP address as received in the first route advertisement message and a second path for the MAC/IP address as stored in MAC data at the gateway;

determining remote paths for the MAC/IP address are suppressed at the gateway; and unsuppressing remote paths for the MAC/IP address at the gateway; and sending a second route advertisement for the MAC/IP address in the first data center, wherein the second route advertisement message specifies a third path for the MAC/IP address and the third path comprises at least the first path.

13. The system of claim 12, wherein determining the conflict between the first path and the second path comprises determining the first path is a local path in the first data center and the second path is a remote path associated with a second data center.

14. The system of claim 13, wherein the third path is determined based on a first sequence number associated with the first route advertisement message or a second sequence number associated with the MAC/IP address at the gateway.

15. The system of claim 14, wherein the first route advertisement message was sent in response to the PE detecting traffic from MAC/IP address at a port of the PE.

16. The system of claim 15, wherein the PE device is a Top-of-Rack (TOR) switch.

17. The system of claim 15, wherein the first sequence number is zero.

18. The system of claim 17, wherein the second route advertisement message is a resyncing route advertisement message including a third sequence number greater than the second sequence number, wherein the resyncing route advertisement is sent based on a determination that that first sequence number is zero.

19. The system of claim 18, wherein the resyncing route advertisement message includes a synchronization indicator in an Extended Community (EC) field.

20. A non-transitory computer readable medium, comprising instructions for:

receiving a first route advertising message from a remote data center at a gateway of a first data center in an Ethernet Virtual Private Network (EVPN) Data Center Interconnect (DCI) Network using Unknown MAC Route (UMR), wherein the first route advertising message specifies a MAC/IP address, a first sequence number, and a remote path associated with the remote data center;

storing the first sequence number and the remote path in association with the MAC/IP address;

suppressing remote paths for the MAC/IP address in the first data center;

receiving a second route advertising message from a Provider Edge (PE) device at the gateway, wherein the PE device is in the first data center of the gateway and the second route advertising message specifies the MAC/IP address, a second sequence number of zero, and a local path;

determining, at the gateway, that the stored first path for the MAC/IP address is the remote path and the second path as received in the second route advertisement message is the local path; and unsuppressing remote paths for the MAC/IP address at the gateway; and sending a third route advertisement for the MAC/IP address in the first data center, wherein the third route advertisement message specifies a third path for the MAC/IP address, the third path including the remote path.

\* \* \* \* \*